United States Patent
Tan et al.

(10) Patent No.: US 10,813,195 B2
(45) Date of Patent: Oct. 20, 2020

(54) INTELLIGENT LIGHTING DEVICE AND SYSTEM

(71) Applicant: SIGNIFY HOLDING B.V., Eindhoven (NL)

(72) Inventors: Pengseng Tan, Peachtree City, GA (US); Nam Chin Cho, Peachtree City, GA (US); Vaibhav Chavan, Ratnagiri (IN); Parth Joshi, Atlanta, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/785,492

(22) Filed: Feb. 7, 2020

(65) Prior Publication Data

US 2020/0267824 A1  Aug. 20, 2020

Related U.S. Application Data

(60) Provisional application No. 62/807,492, filed on Feb. 19, 2019.

(51) Int. Cl.
| | |
|---|---|
| *H05B 47/10* | (2020.01) |
| *H05B 47/12* | (2020.01) |
| *G10L 15/30* | (2013.01) |
| *G10L 17/24* | (2013.01) |
| *H05B 47/125* | (2020.01) |

(52) U.S. Cl.
CPC .............. *H05B 47/12* (2020.01); *G10L 15/30* (2013.01); *G10L 17/24* (2013.01); *H05B 47/125* (2020.01)

(58) Field of Classification Search
CPC ........ H05B 45/00; H05B 45/10; H05B 47/00; H05B 47/10; H05B 47/12; H05B 47/125; G10L 15/30; G10L 17/24; G10L 15/22; G10L 17/22; G10L 17/26; G06F 3/16
See application file for complete search history.

(56) References Cited

U.S. PATENT DOCUMENTS

| | | | |
|---|---|---|---|
| 2013/0325484 A1* | 12/2013 | Chakladar | G10L 15/22 704/275 |
| 2015/0212727 A1 | 7/2015 | Fang et al. | |
| 2016/0127657 A1 | 5/2016 | Mukai et al. | |
| 2019/0341032 A1* | 11/2019 | Hammons | G06F 1/3231 |

* cited by examiner

*Primary Examiner* — Jimmy T Vu

(57) ABSTRACT

A lighting device includes a microphone, a camera, and a controller. The controller is configured to control a light source of the lighting device and determine whether an utterance captured by the microphone or a gesture captured by the camera corresponds to a wake-word. The controller is further configured to generate a command based on at least an image of an item captured by the camera if the controller determines that the utterance or the gesture corresponds to the wake-word. The controller is also configured to send the command to a cloud server and to provide a response to the command, where the response is received from the cloud server.

20 Claims, 8 Drawing Sheets

INTELLIGENT LIGHTING DEVICE AND SYSTEM

CROSS REFERENCE TO RELATED APPLICATIONS

The present application claims priority under 35 U.S.C. Section 119(e) to U.S. Provisional Patent Application No. 62/807,492, filed Feb. 19, 2019 and titled "Intelligent Lighting Device And System," the entire content of which is incorporated herein by reference.

TECHNICAL FIELD

The present disclosure relates generally to lighting-related solutions, and more particularly to lighting devices and systems with voice and vision capabilities.

BACKGROUND

Online activities, such as searches and e-commerce, have become routine activities of everyday life. People typically engage in online activities or otherwise access online resources using devices such as tablets, smartphones, laptops, etc. In some cases, voice-operated devices may be used to engage in online activities. However, some people may not have convenient access to such devices. Further, some voice-operated devices that may be used for online activities are standalone devices that have to be placed reasonably close to a person to pick up voice commands. Positioning a voice-operated device for reliable operation may sometimes be challenging and/or inconvenient. Some voice operated devices may also have scope of use limitations because of the reliance on only verbal commands. Thus, a solution that enables a user to conveniently engage in online activities and access online resources is desirable.

SUMMARY

The present disclosure relates generally to lighting-related solutions, and more particularly to lighting devices and systems with voice and vision capabilities. In an example embodiment, a lighting device includes a microphone, a camera, and a controller. The controller is configured to control a light source of the lighting device and determine whether an utterance captured by the microphone or a gesture captured by the camera corresponds to a wake-word. The controller is further configured to generate a command based on at least an image of an item captured by the camera if the controller determines that the utterance or the gesture corresponds to the wake-word. The controller is also configured to send the command to a cloud server and to provide a response to the command, where the response is received from the cloud server.

In another example embodiment, a non-transitory computer-readable medium of a controller of a lighting device contains instructions executable by a processor, where the instructions include controlling a light source of the lighting device, determining whether an utterance captured by a microphone of the lighting device or a gesture captured by a camera of the lighting device corresponds to a wake-word, generating a command based on at least an image of an item captured by the camera if the utterance or the gesture corresponds to the wake-word, sending the command to a cloud server, and providing a response to the command, wherein the response is received from the cloud server based on the command provided by the controller.

In another example embodiment, a lighting system includes a first lighting device comprising a microphone, a first camera, and a first controller. The first controller is configured to generate a command to search for a first item in an area based on an utterance captured by the microphone and an image of a second item captured by the first camera. The first item and the second item are a same type of items. The lighting system further includes a second lighting device that includes a second camera and a second controller. The second controller is configured to receive the command from the first lighting device, control the second camera to capture an image of the area in response to the command, and provide a response to the first lighting device. Based on the response from the second lighting device, the first controller is configured to provide a notification via a light source of the first lighting device or a speaker of the first lighting device indicating whether the first item is in the area.

BRIEF DESCRIPTION OF THE FIGURES

Reference will now be made to the accompanying drawings, which are not necessarily drawn to scale, and wherein.

Figure 1:
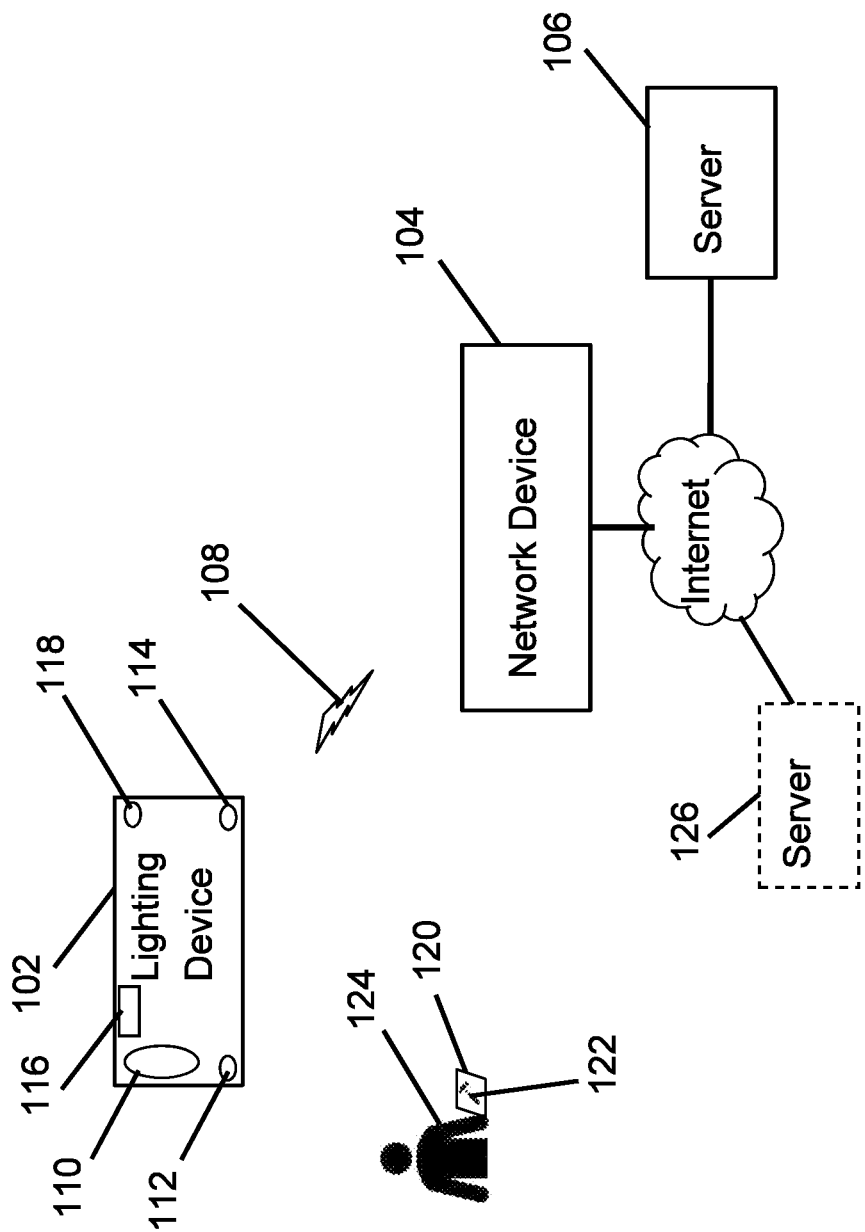
FIG. 1 illustrates a lighting device with integrated voice, vision, and communication capabilities according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different figures may designate like or corresponding, but not necessarily identical elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

Voice-activated smart devices generally do not have the capability to receive images as inputs and to operate based on the received images. In some example embodiments of the present application, a lighting device includes one or more built-in microphone(s) and built-in camera(s) and can operate based on both voice commands received by the microphone(s) as well as images captured by the camera(s) to allow a person to engage in online activities such as online searches, e-commerce, etc. In some example embodiments of the present application, a lighting device includes one or more built-in camera(s) that capture gesture inputs, such as hand gestures, and that can operate based on the gesture inputs to allow a person to engage in online activities such as online searches, e-commerce, etc. In some example embodiments, a lighting device includes capabilities such as edge-based or cloud-based artificial intelligence capabilities to perform e-commerce tasks as well as other tasks including identification of persons/objects based on image inputs, searching for missing objects in an area such as a home, etc.

Turning now to the figures, example embodiments are described. FIG. 1 illustrates a lighting device 102 with integrated voice, vision, and communication capabilities according to an example embodiment. The lighting device 102 may be a lighting fixture, a wall dimmer, etc. In some example embodiments, the lighting device 102 may communicate with a network device 104. For example, the network device 104 may be an access point, a router, a gateway device, or a combination of such devices to access the internet. For example, the lighting device 102 may communicate wirelessly with the network device 104 using radiofrequency (RF) signals 108 (e.g., Wi-Fi signals, etc.). The lighting device 102 may communicate with a server 106, a server 126, and other servers through the network device 104. The servers 106, 126 may be cloud servers that are used for basic online searches, for purchases (e.g., an e-commerce server), for specialized tasks such as image analysis, voice recognition, etc. For example, the servers 106, 126 may implement machine learning/deep learning technologies to perform operations such as speech, image, gesture, and text identification/recognition.

In some example embodiments, the lighting device 102 may include a light source 110 (e.g., an LED light source), a camera 112, a microphone 114, and a controller 116. The lighting device 102 may also include a speaker 118 that may be used to provide audio responses and notifications. The camera 112 may include one or more video or picture cameras. The microphone 114 may include an array of microphones that are located at different locations on the lighting device 102.

In some example embodiments, the controller 116 may control the operations of the lighting device 102 including the light source 110, the camera 112, the microphone 114, and the speaker 118. For example, the controller 116 may control the light source 110 based on lighting control commands received by the lighting device 102 wirelessly via RF signals such as the RF signals 108. The controller 116 may also control the lighting device 102 based on voice commands received via the microphone 114 or based on visual commands (e.g., gestures, written text) captured by the camera 112. In some example embodiments, the lighting device 102 accesses the internet via a wired connection (e.g., Ethernet connection to the network device 104) and may also receive lighting control commands via the wired connection.

In some example embodiments, the controller 116 may control the camera 112 to capture an image (video and/or picture). For example, the controller 116 may control the camera 112 to capture an image of an item 122 in a picture 120 or an image of the picture 120. To illustrate, the camera 112 may have a relatively narrow field of view or may have an adjustable field of view (e.g., by zooming in and out) that is controllable by the controller 116 to capture an image of the item 122 or the picture 120. For example, a narrow field of view of the camera 112 may allow the camera 112 to capture an image of the item 122 or the picture 120 to the exclusion of some other items. In some example embodiments, the controller 116 may process the image captured by the camera 112 to identify the item 122. Alternatively or in addition, the controller 116 may send the image of the item 122 captured by the camera 112 to a cloud server (e.g., the server 106) that can process the image to identify the item 122. After the item 122 is identified, the controller 116 may generate a command (e.g., a question, an instruction, et.) at least based on the item 122. The controller 116 may perform operations to respond to the command or may send the command (e.g., make an application programming interface (API) call) to the server 106, the server 126, or another server. The controller 116 may provide a response generated by the controller 116 or received from the server. For example, the controller 116 may provide the response via the light source 110 and/or the speaker 118. To illustrate, the controller 116 may provide a visual response (e.g., flash a light) to the command via the light source 110 and/or an audio response (e.g., a verbal response) via the speaker 118.

In some example embodiments, the controller 116 may control the camera 112 to capture a gesture that is made by the person 124. For example, the camera 112 may capture a hand gesture (e.g., an extended index finger and other fingers folded, a thumb pointing up, a V-shape made with two fingers, etc.) and a facial gesture (e.g., a frown, one closed eye, two closed eyes, etc.) that are made by the person 124. The controller 116 may process the image of a gesture captured by the camera 112 to identify/recognize the gesture. Alternatively or in addition, the controller 116 may send the image of a gesture captured by the camera 112 to a cloud server (e.g., the server 126) that can process the image to identify/recognize the gesture. After the gesture is identified/recognized, the controller 116 may generate a command (e.g., a question, an instruction, etc.) at least based on the gesture. The controller 116 may perform operations to respond to the command or may send the command (e.g., make an API call) to the server 106, the server 126, or another server. The controller 116 may provide a response generated by the controller 116 or received from the server. For example, the controller 116 may provide the response via the light source 110 and/or the speaker 118. To illustrate, the controller may provide a visual response to the command via the light source 110 and/or an audio response via the speaker 118.

In some example embodiments, the controller 116 may control the camera 112 to capture a written text. For example, the item 122 in the picture 120 may be a text that is written on a piece of paper, a board, etc. The camera 112 may capture the written text, and the controller 116 may process the written text (e.g., perform optical character recognition) captured by the camera 112 to identify/recognize the written text. Alternatively or in addition, the controller 116 may send data generated from a written text captured by the camera 112 to a cloud server (e.g., the server 126) that can process the image to identify/recognize the written text. After the written text is identified/recognized, the controller 116 may generate a command (e.g., one or more questions, one or more instructions, etc.) at least based on the written text. The controller 116 may perform operations to respond to the command or may send the command (e.g., make an API call) to the server 106, the server 126, or another server. The controller 116 may then provide a response generated by the controller 116 or received from the server via the light source 110 and/or the speaker 118. For example, the controller 116 may provide a visual response to the command via the light source 110 and/or an audio response via the speaker 118.

In some example embodiments, the controller 116 may control the microphone 114 to capture/receive by the microphone 114 an utterance (e.g., a word, words, a phrase, a sentence, etc. uttered by a person). For example, the utterance may be made by the person 124. The controller 116 may process audio data generated from the utterance captured by the microphone 114 to recognize the utterance. Alternatively or in addition, the controller 116 may send audio data generated from an utterance captured by the microphone 114 to a cloud server (e.g., the server 106) that can process the audio data to recognize the utterance. After the utterance is identified/recognized, the controller 116 may generate a command at least based on the utterance. The controller 116 may then perform operations to respond to the command or may send the command (e.g., make an API call) to the server 106, the server 126, or another server. The controller 116 may provide a response generated by the controller 116 or received from the server via the light source 110 and/or the speaker 118. For example, the controller 116 may provide a visual response to the command via the light source 110 and/or an audio response via the speaker 118.

In some example embodiments, the lighting device 102 may determine whether an utterance or a gesture corresponds to or matches a wake-word before generating a command from another image, utterance, gesture, and/or written text or before responding to a command generated from another image, utterance, gesture, or written text. For example, the controller 116 may process an utterance received via the microphone 114 to determine whether the utterance corresponds to or matches a wake-word. One or more wake-words (e.g., "xyz", "abc xyz", etc.) may be stored in a memory device of the controller 116, and the controller 116 may compare the digital representation of the utterance against the stored one or more wake-words to determine whether the utterance corresponds to a wake-word. For example, the digital representation of the utterance may be generated by an analog to digital converter of the controller 116. Alternatively or in addition, the controller 116 may compare a digital representation of a gesture (e.g., a hand gesture) against one or more wake-words stored in the memory of the controller 116. For example, the controller 116 may translate the gesture into a word or a phrase and compare the word or the phrase against one or more wake-words. Alternatively, the controller 116 may compare an image of the gesture against one or more wake-words that may be one or more images stored in the memory device. The controller 116 may provide a visual notification or an audio notification to indicate that an utterance or a gesture corresponds to or matches the wake-word.

If the controller 116 determines that an utterance or a gesture does not correspond to a wake-word, the controller 116 may keep checking whether subsequent utterances or gestures correspond to/match a wake-word until the controller 116 determines that a particular utterance or a gesture matches a wake-word. The controller 116 may also control the light source 110 to visually indicate (e.g., flash a light, emit a light for a duration, etc.) to indicate that the utterance or the gesture corresponds to or matches the wake-word. If the controller 116 determines that an utterance or a gesture corresponds to or matches a wake-word, the controller 116 may perform further operations based on subsequent utterances, gestures, and/or text messages.

In some example embodiments, after determining an utterance or a gesture matches a wake-word, the controller 116 may generate a command based on the item 122 and a subsequent utterance (e.g., a word, words, a phrase, a sentence, etc.). For example, the controller 116 may generate the command from an image of the item 122 captured by the camera 112 and an utterance captured/received by the microphone 114. To illustrate, the person 124 may say a word, words, a phrase, or a sentence related to the item 122 while the picture 120 or the item 122 is in the field of view of the camera 112. For example, the person 124 may utter, "What is the item shown in the picture called," "Find the item shown in the picture," or "Purchase the item shown in the picture from Abcde" from among many possibilities while the picture 120 or the item 122 is in the field of view of the camera 112.

In some example embodiments, in order to generate the command, the controller 116 may first process an utterance to recognize the information conveyed by the utterance. For example, the controller 116 may include or access a database of words, phrases, sentences, etc. and associated actions to determine the information conveyed by an utterance. The controller 116 may also process the image of the item 122 captured by the camera 112 to identify the item 122 or send image data of the item 122 to a cloud server (e.g., the server 106) to identify the item 122. For example, the controller 116 may include or access a database of images of items and corresponding identification information, and the controller may compare the image of the item 122 against the images in the database. Alternatively, the controller 116 may send audio data generated from the utterance to a cloud server (e.g., the server 106) for processing to recognize the information conveyed by the utterance. The controller 116 may also send the image of the item 122 to a cloud server (e.g., the server 106) for processing to identify the item 122. After the utterance is recognized and the item 122 is identified, the controller 116 may generate the command based on the utterance and the item 122. The controller 116 may fully or partially execute the command locally or may send the command (e.g., make an API call) to a cloud server (e.g., the server 126). The controller 116 may provide a response to the command via the speaker 118 or via the light source 110. The response may be an answer to a question, a result of an execution of the command (e.g., a response indicating that a purchase has been made), etc.

In some example embodiments, after determining an utterance or a gesture matches a wake-word, the controller 116 may generate a command based on the item 122 and a subsequent gesture (e.g., a hand gesture). For example, the controller 116 may generate the command from an image of the item 122 captured by the camera 112 and a gesture captured by the camera 112. To illustrate, the person 124 may make a hand gesture in the field of view of the camera 112 followed with placing the picture 120 or the item 122 in the field of view of the camera 112. Alternatively, the person 124 may make a hand gesture in the field of view of the camera 112 while the picture 120 or the item 122 is also in the field of view of the camera 112.

In some example embodiments, in order to generate the command, the controller 116 may first process the image of the gesture to recognize the information conveyed by the gesture. For example, the controller 116 may include or access a database of gestures and corresponding translations.

The controller 116 may also process the image of the item 122 captured by the camera 112 to identify the item 122. For example, the controller 116 may include or access a database of images of items and corresponding identification. Alternatively, the controller 116 may send image data of the gesture to a cloud server (e.g., the server 106) for processing to recognize the information conveyed by the gesture. The controller 116 may also send image data of the item 122 to a cloud server (e.g., the server 106) to identify the item 122. After the gesture is recognized and the item 122 is identified, the controller 116 may generate the command based on the gesture and the item 122. The controller 116 may fully or partially execute the command locally or may send the command (e.g., make an API call) to a cloud server (e.g., the server 126). The controller 116 may provide a response to the command via the speaker 118 or via the light source 110. The response may be an answer to a question, a result of an execution of the command (e.g., a response indicating that a purchase has been made), etc.

In some example embodiments, after determining an utterance or a gesture matches a wake-word, the controller 116 may generate a command based on the item 122 and a written text (e.g., a word, words, a phrase, a sentence, etc. written on a piece of paper or a board). For example, the picture 122 may include written text instead of or in addition to the item 122. Alternatively, the item 122 may be a written text. The controller 116 may generate the command from an image of the item 122 captured by the camera 112 and a written text captured by the camera 112 or another camera of the lighting device 102. To illustrate, the person 124 may place a piece of paper with a written text (e.g., "What is the item shown in the picture called?", "Where is the item shown in the picture located?", "Purchase the item shown in the picture," etc.) in the field of view of the camera 112 followed by placing the picture 120 or the item 122 in the field of view of the camera 112. Alternatively, the person 124 may place a piece of paper with a written text in the field of view of the camera 112 while the picture 120 or the item 122 is also in the field of view of the camera 112.

In some example embodiments, in order to generate the command, the controller 116 may first process the written text to recognize the information conveyed by the written text or may send data generated from the written text to a cloud server (e.g., the server 106) for processing to recognize the information conveyed by the written text. For example, the controller 116 may include or access a database of words, phrases, sentences, etc. and associated actions. The controller 116 may also process the image of the item 122 captured by the camera 112 to identify the item 122 or send image data of the item 122 to a cloud server (e.g., the server 106) to identify the item 122. For example, the controller 116 may include or access a database of images of items and corresponding identification information. Alternatively, the controller 116 may send the text data generated from the written text to a cloud server (e.g., the server 106) for processing to recognize the information conveyed by the written text. The controller 116 may also send the image of the item 122 to a cloud server (e.g., the server 106) for processing to identify the item 122. After the written text is recognized and the item 122 is identified, the controller 116 may generate the command based on the written text and the item 122. The controller 116 may fully or partially execute the command locally or may send the command (e.g., make an API call) to a cloud server (e.g., the server 126). The controller 116 may provide a response to the command (i.e., effectively to the written text related to the item 122) via the speaker 118 or via the light source 110. The response may be an answer to a question, a result of execution of the command (e.g., a response indicating that a purchase has been made), etc.

In some example embodiments, after determining a gesture matches a wake-word, the controller 116 may generate a command based on another gesture (e.g., a hand gesture or a facial gesture) captured by the camera 112. To illustrate, when the person 124 makes a hand gesture in the field of view of the camera 112, the controller 116 may process the image of the gesture captured by the camera 112 to recognize the information conveyed by the gesture or may send image data of the gesture to a cloud server (e.g., the server 106) for processing to recognize the information conveyed by the gesture. For example, the controller 116 may include or access a database of gestures and corresponding translations. After the gesture is recognized, the controller 116 may generate the command based on the gesture. The controller 116 may fully or partially execute the command locally or may send the command (e.g., make an API call) to a cloud server (e.g., the server 126 or another server). The controller 116 may provide a response to the command (i.e., effectively to the gesture) via the speaker 118 or via the light source 110. The response may be an answer to a question, a result of execution of the command (e.g., indicate that a purchase has been made), etc.

In some example embodiments, after determining a gesture matches a wake-word, the controller 116 may generate a command based on a written text (e.g., a word, words, a phrase, a sentence, etc. written on a piece of paper or a board) captured by the camera 112. To illustrate, when the person 124 places a written text in the field of view of the camera 112, the controller 116 may process the written text captured by the camera 112 to recognize the information conveyed by the written text or may send data generated from the written text to a cloud server (e.g., the server 106) for processing to determine the information conveyed by the written text. For example, the controller 116 may include or access a database of words, phrases, sentences, etc. and associated actions. After the written text is recognized, the controller 116 may generate the command based on the written text. The controller 116 may fully or partially execute the command locally or may send the command (e.g., make an API call) to a cloud server (e.g., the server 126 or another server). The controller 116 may provide a response to the command (i.e., effectively to the written text) via the speaker 118 or via the light source 110. The response may be an answer to a question, a result of execution of the command (e.g., indicate that a purchase has been made), etc.

By using spoken words, gestures, and written text with or without a related item or image of an item, the person 124 may be able to perform online searches, make purchases, access online resources such as news articles, etc. using the lighting device 102. The person 124 may also be able to control lighting operations of the lighting device 102 using spoken words, gestures, and written text in a similar manner. In general, the lighting device 102 may perform voice processing, image processing, text processing to interpret, identify, recognize, etc. voices, objects, text, etc. using one or more methods known by those of ordinary skill in the art.

In some alternative embodiments, the network device 104 may be omitted without departing from the scope of this disclosure. For example, the lighting device may communicate with a cloud server using another communication technology, such as GSM, UMTS, etc. In some alternative embodiments, the lighting device 102 may include other components than shown without departing from the scope of this disclosure.

Figure 2:
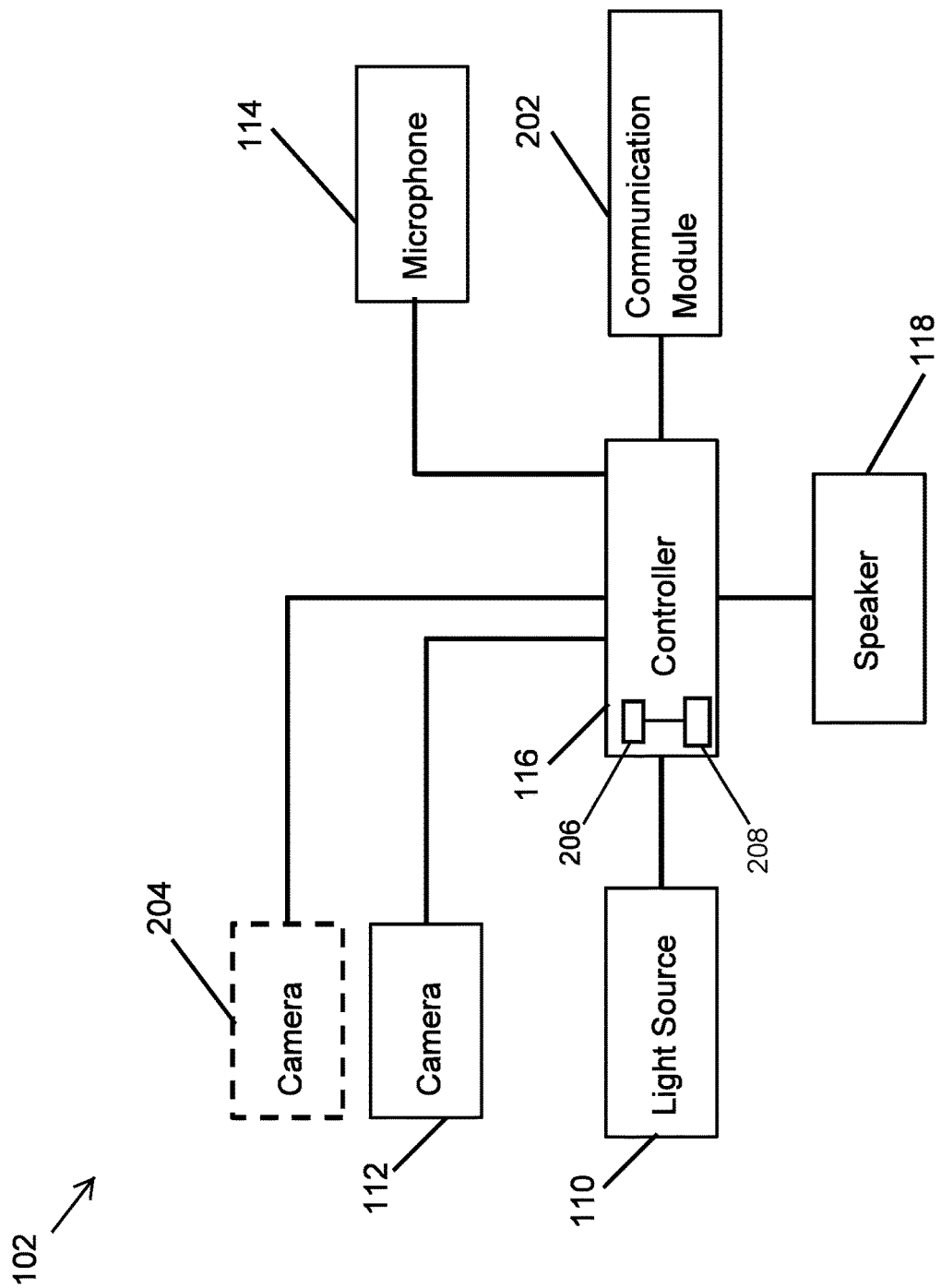
FIG. 2 illustrates a block diagram of the lighting device of FIG. 1 according to an example embodiment.

FIG. 2 illustrates a block diagram of the lighting device 102 of FIG. 1 according to an example embodiment. Referring to FIGS. 1 and 2, the lighting device 102 may include the controller 116, the light source 110, the camera 112, the microphone 114, and a communication module 202. The lighting device 102 may also include an optional camera 204. For example, the camera 112 may have a narrow field of view and the camera 204 may have a wide field of view. Alternatively, the camera 112 may have a wide field of view or an adjustable field of view that is controllable by the controller 116. The communication module 202 may include one or more transceivers, transmitters, and/or receivers that may be used to transmit and receive wireless (i.e., RF) and wired signals. For example, the controller 116 may send and/or receive commands, data, etc. via the communication module 202.

In some example embodiments, the controller 116 may include a microcontroller/a microprocessor 208 along with related components such as a memory device 206, an analog-to-digital converter, a digital-to-analog converter, etc. that may be used to implement the operations of the controller 116. In some example embodiments, the controller 116 may be implemented using hardware (e.g., an FPGA, a graphic processing unit (GPU), etc.), executable software, or a combination thereof. The controller 116 may implement machine learning/deep learning technologies to execute some operations such as speech, image, gesture, and text identification/recognition. In general, the microcontroller/microprocessor 208 may execute software code stored in the memory device 206 to perform operations described herein with respect to the controller 116.

In some alternative embodiments, the lighting device 102, which may be a lighting fixture (e.g., a recessed lighting fixture), a wall dimmer, etc., may include more or fewer components than shown without departing from the scope of this disclosure. For example, in some alternative embodiments, the microphone 114, the speaker 118, and/or the camera 204 may be omitted without departing from the scope of this disclosure.

Figure 3:
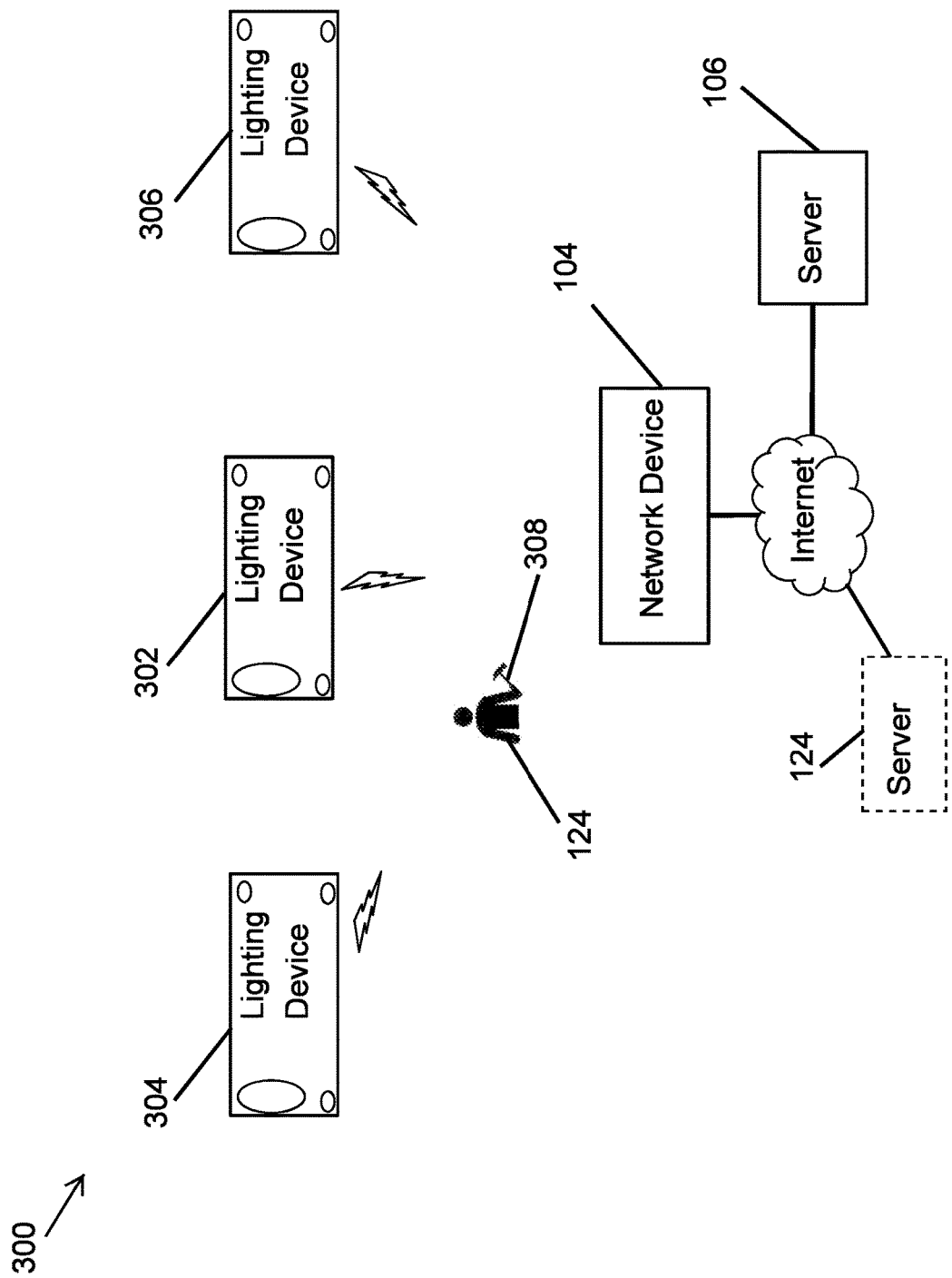
FIG. 3 illustrates a lighting system of lighting devices with integrated voice, vision, and communication capabilities according to an example embodiment.

FIG. 3 illustrates a lighting system 300 of lighting devices 302, 304, 306 with integrated voice, vision, and communication capabilities according to an example embodiment. Referring to FIGS. 1-3, in some example embodiments, each of the lighting devices 302, 304, 306 is another one of the lighting device 102 and may operate as described with respect to FIG. 1. To illustrate, the lighting devices 302, 304, 306 have the same wake-word(s) or different wake-words from each other, and each of the lighting devices 302, 304, 306 may determine whether an utterance by the person 124 corresponds to a wake-word of the respective lighting device 302, 304, 306. Each lighting device 302, 304, 306 may also process utterances, gestures, and written text with or without an associated item (e.g., an item 308 or a picture of an item as described with respect to FIG. 1) to generate a command. The command may be executed by the controller of the respective lighting device and/or may be sent to a cloud server such as the server 106, 124 in a similar manner as described with respect to the lighting device 102. Each lighting device 302, 304, 306 may also provide a response via the light source and/or the speaker of the respective lighting device 302, 304, 306 in a similar manner as described with respect to the lighting device 102.

In some example embodiments, multiple persons may individually interact with a respective one of the lighting devices 302, 304, 306 for performing online activities such as searches, purchases, etc. In some alternative embodiments, the person 124 may move around a space and use the closest one of the lighting devices 302, 304, 306 to engage in online activities. In some alternative embodiments, the system 300 may include more or fewer lighting devices than shown without departing from the scope of this disclosure. In some alternative embodiments, some of the lighting devices of the system 300 may not include all of the components described with respect to the lighting device 102 without departing from the scope of this disclosure.

Figure 4:
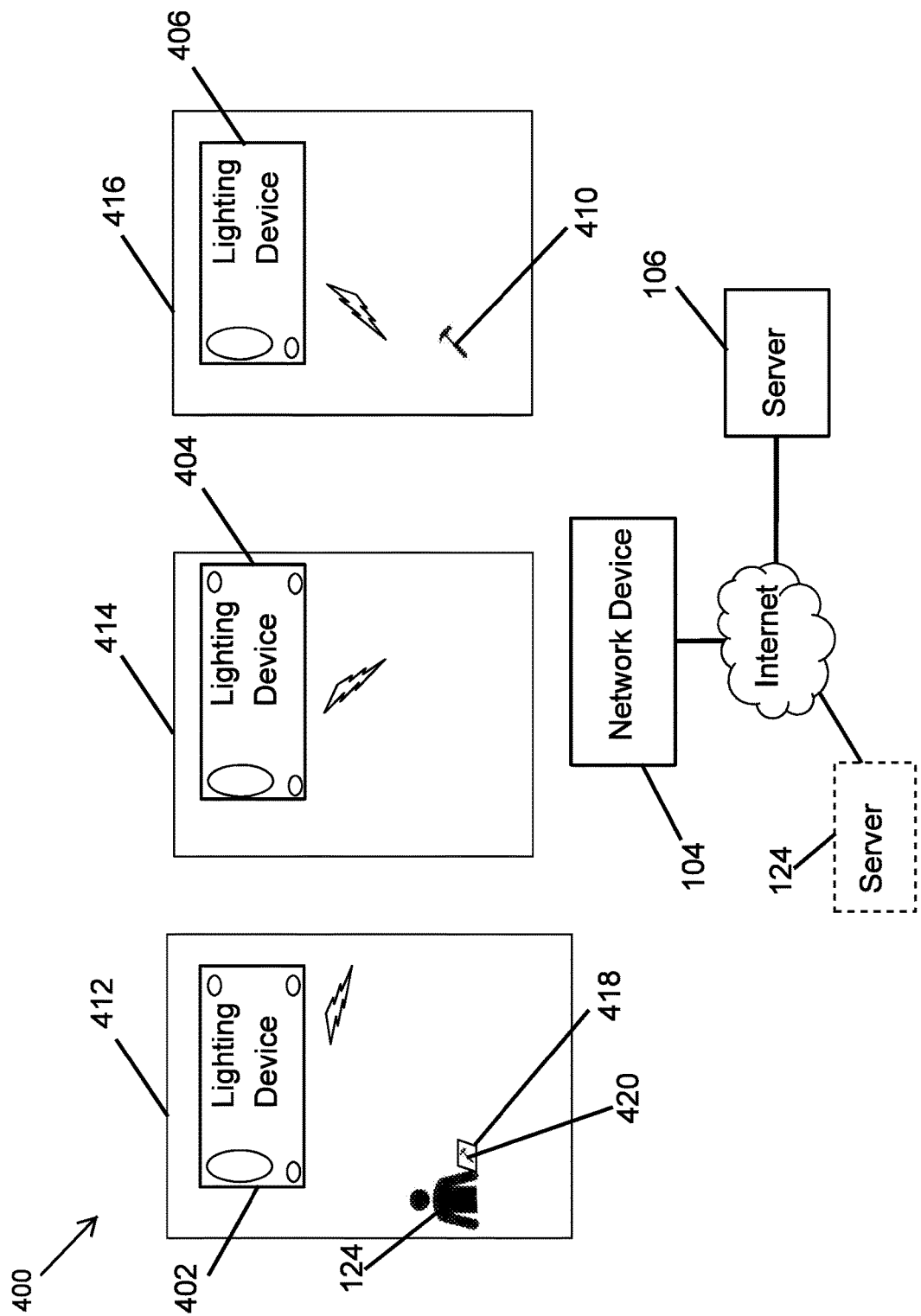
FIG. 4 illustrates a lighting system of lighting devices with integrated voice, vision, and communication capabilities according to another example embodiment.

FIG. 4 illustrates a lighting system 400 of lighting devices 402, 404, 406 with integrated voice, vision, and communication capabilities according to another example embodiment. Referring to FIGS. 1, 2, and 4, in some example embodiments, each of the lighting devices 402, 404 is another one of the lighting device 102 and may operate as described with respect to FIG. 1, and the lighting device 406 may be similar to the lighting device 102 without a microphone and a speaker.

In some example embodiments, the lighting devices 402, 404, 406 may be used for online activities in the same manner as described above. Alternatively or in addition, the lighting devices 402, 404, 406 may be used to search for an item locally (e.g., inside a room, a building, etc.) The lighting devices 402, 404, 406 may be in different rooms or different areas 412, 414, 416 of a space (e.g., a hall, a house, etc.) from each other. Using the lighting devices 402, 404, 406, a person 124 may use a picture 418 of an item 420 (or an actual item such as the item 308 of FIG. 3) along with an utterance, a gesture, or a written text to search for an item that is similar to the item 420 (or the item 308) in the rooms 412, 414, 416. For example, the lighting device 402 may generate a command based on one or more images of the item 420 captured by the camera of the lighting device 402 and an utterance (e.g., "Find this item in the house") by the person 124 captured/received by the microphone of the lighting device 402. The command may be to search for an item that matches (e.g., looks the same as or similar to) the item 420. For example, the command may include one or more images and/or a description of the item 420. In some example embodiments, the lighting device 402 may capture the image(s) and/or generate the command after the lighting device 402 establishes that an utterance or a gesture by the person 124 matches the wake-word of the lighting device 402.

In some example embodiments, in response to the command, the controller of the lighting device 402 may control the camera of the lighting device 402 to capture one or more images of the room 412. The controller of the lighting device 402 may process the image(s) of the room 412 or may send the image(s) of the room 412 to a cloud server (e.g., the server 106, the server 124, or another server) to determine whether an item that matches the item 420 appears in the image(s) of the room 412. For example, the controller of the lighting device 402 may send to the cloud server image(s) of the room 412 along with one or more images of the item 420 and/or along with a description of the item 420 as determined by the controller of the lighting device 402 from the image(s) of the item 420. The lighting device 402 may provide a notification via the light source and/or the speaker of the lighting device 402 whether the item matching the item 420 is found in the room 412 and/or in the overall space that includes the room 412.

In some example embodiments, the controller of the lighting device 402 may send the command to the lighting devices 404, 406. For example, the lighting device 404 may receive the command, and, in response to the command, the controller of the lighting device 404 may control the camera of the lighting device 404 to capture one or more images of the room 414. For example, the command may include images(s) of the item 420 and/or a description of the item 420 and instructions to capture images(s) of the room 414. The command may also include instructions to determine whether an item matching the item 420 appears in the room 414. The controller of the lighting device 404 may process the image(s) captured by the camera of the lighting device 404 or may send the image (s) to a cloud server to determine whether an item that matches the item 420 appears in the image(s) of the room 414. For example, the controller of the lighting device 404 may send the image(s) and/or the description of the item 420 received from the first lighting device 402 to the cloud server along with the image(s) of the room 414. The lighting device 404 may send the result of the image analysis (i.e., whether an item matching the item 420 is in the image(s) of the room) to the lighting device 402. The lighting device 402 may provide a notification (e.g., flash the light X number of times or verbally) via the light source and/or the speaker of the lighting device 402 indicating whether an item matching the item 420 is found in the room 414 and/or in the overall space that includes the room 412. Alternatively or in addition, the lighting device 404 may provide an audio or visual notification that indicates whether the item matching the item 420 is in the room 414 and/or in the overall space that includes the room 414.

In some example embodiments, the lighting device 404 may send the image(s) captured by the camera of the lighting device 404 to the lighting device 402, and the controller of the lighting device 402 may process the received image(s) or send the received image(s) to a cloud server to analyze the image(s) to determine whether an item matching the item 420 appears in the image(s). Based on the analysis of the received images, the lighting device 402 may provide a notification via the light source and/or the speaker of the lighting device 402 whether the item matching the item 420 is found in the room 414 and/or in the overall space that includes the room 412.

In some example embodiments, the lighting device 406 may receive the command from the lighting device 402, and the lighting device 406 may operate in a similar manner as described with respect to the lighting device 404 to determine whether an item matching the item 420 is in the room 416. For example, based on the command received from the lighting device 402, the controller of the lighting device 406 may capture one or more image(s) of the room 416 and may process the image(s) or send the image(s) to a cloud server or to the lighting device 402 for analysis to determine whether the item matching the item 420 is in the room 416. For example, the image analysis may indicate that an item 410 in the room 416 matches the item 420, and the lighting device 402 and/or the lighting device 406 may provide a visual and/or audio notification that an item matching the item 420 is in the room 416 and/or in the overall space that includes the room 412.

The lighting system 400 can be useful to conveniently find objects in a room or a building particularly by those that have physically or speech impairments. The lighting devices of the lighting system 400 may also be used in a manner described with respect to FIGS. 1-3 for convenient online activities.

In some example embodiments, multiple persons may individually interact with a respective one of the lighting devices 402, 404, 406 for performing online activities and local such as searches, purchases, etc. In some alternative embodiments, the person 124 may move around a space and use the closest one of the lighting devices 302, 304, 306 to engage in online activities. In some alternative embodiments, the system 400 may include more or fewer lighting devices than shown without departing from the scope of this disclosure. In some alternative embodiments, some of the lighting devices of the system 400 may not include all of the components described with respect to the lighting device 102 without departing from the scope of this disclosure. In some alternative embodiments, one or more components shown in FIG. 4 may be omitted without departing from the scope of this disclosure.

Figure 5:
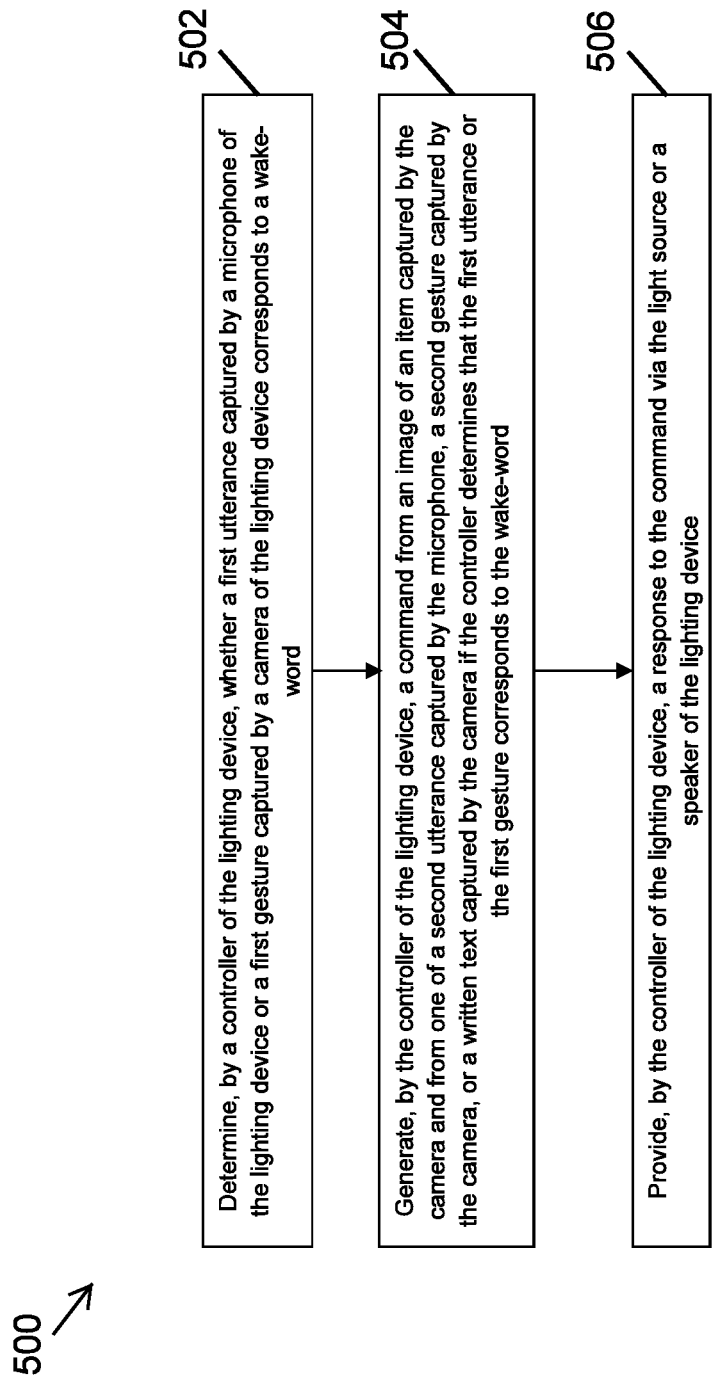
FIG. 5 illustrates a method of providing voice and vision-based service by a lighting device according to another example embodiment.

FIG. 5 illustrates a method 500 of providing voice and vision-based service by a lighting device according to another example embodiment. Referring to FIGS. 1-5, in some example embodiments, at step 502, the method 500 may include determining, by a controller (e.g., the controller 116) of the lighting device (e.g., the lighting device 102), whether a first utterance captured by a microphone of the lighting device or a first gesture captured by a camera (e.g., the camera 112) of the lighting device corresponds to a wake-word. At step 504, the method 500 may include generating, by the controller of the lighting device, a command from an image of an item captured by the camera and from one of a second utterance captured by the microphone, a second gesture captured by the camera, or a written text captured by the camera if the controller determines that the first utterance or the first gesture corresponds to the wake-word. At step 506, the method 500 may include providing, by the controller of the lighting device, a response to the command via a light source of the lighting device or a speaker of the lighting device.

In some alternative embodiments, the method 500 may also include more or fewer steps without departing from the scope of this disclosure.

Figure 6:
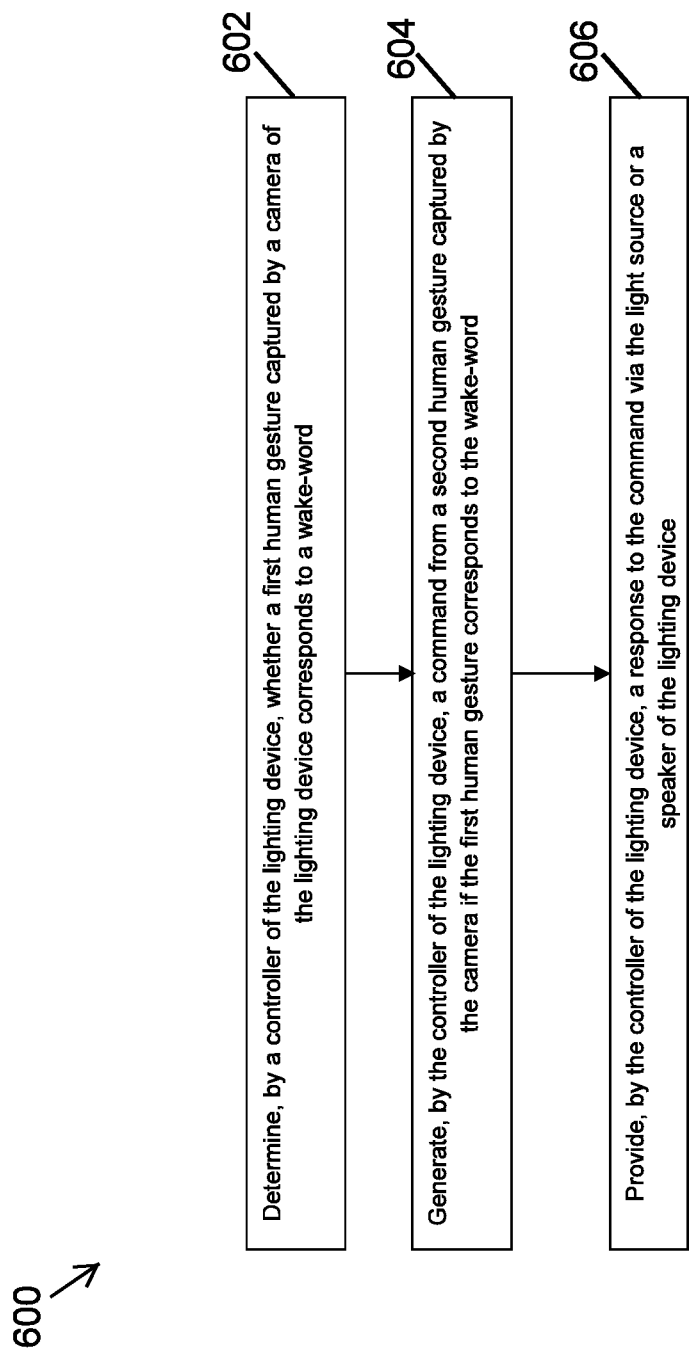
FIG. 6 illustrates a method of providing voice and vision-based service by a lighting device according to another example embodiment.

FIG. 6 illustrates a method 600 of providing voice and vision-based service by a lighting device according to another example embodiment. Referring to FIGS. 1-6, in some example embodiments, at step 602, the method 600 may include determining, by a controller (e.g., the controller 116) of the lighting device (e.g., the lighting device 102), whether a first human gesture captured by a camera of the lighting device corresponds to a wake-word. At step 604, the method 600 may include generating, by the controller of the lighting device, a command from a second human gesture captured by the camera if the first human gesture corresponds to the wake-word. At step 606, the method 600 may include providing, by the controller of the lighting device, a response to the command via the light source or a speaker of the lighting device.

In some example embodiments, the method 600 may include more or fewer steps without departing from the scope of this disclosure.

Figure 7:
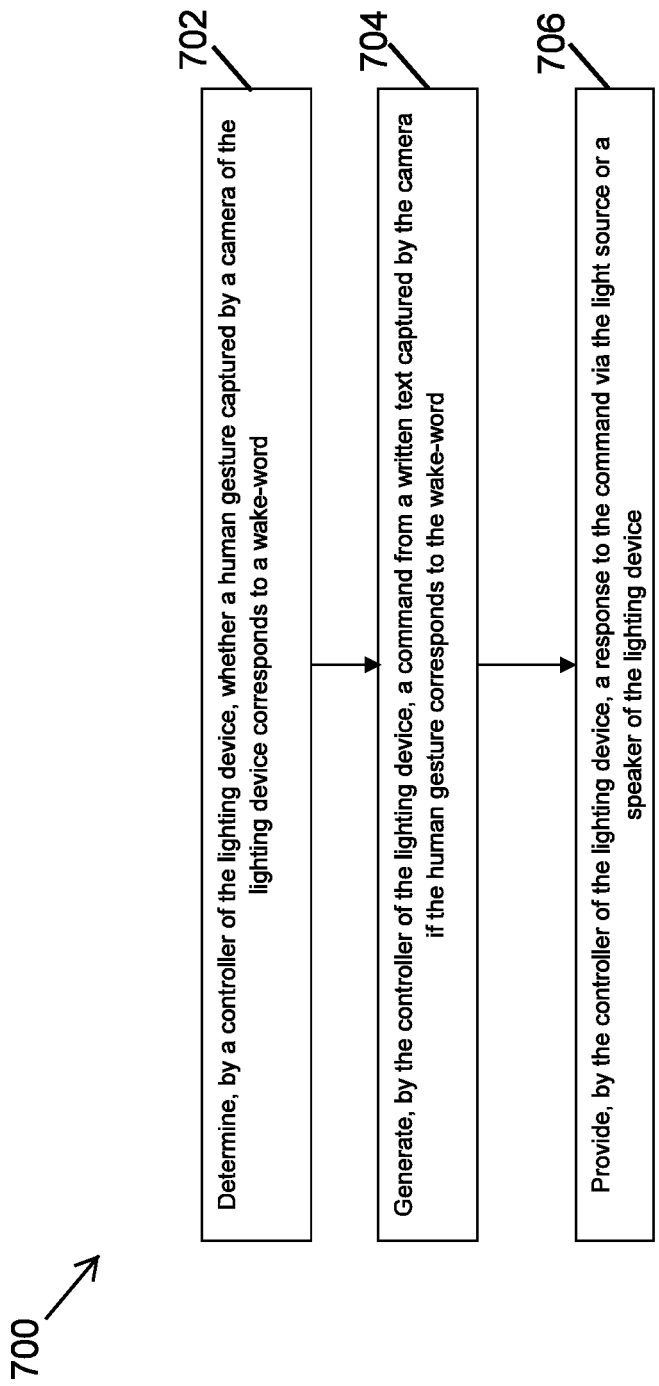
FIG. 7 illustrates a method of providing voice and vision-based service by a lighting device according to another example embodiment.

FIG. 7 illustrates a method 700 of providing voice and vision-based service by a lighting device according to another example embodiment. Referring to FIGS. 1-7, in some example embodiments, at step 702, the method 700 may include determining, by a controller (e.g., the controller 116) of the lighting device (e.g., the lighting device 102), whether a human gesture captured by a camera of the lighting device corresponds to a wake-word. At step 704, the method 700 may include generating, by the controller of the lighting device, a command from a written text captured by the camera if the human gesture corresponds to the wake-word. At step 706, the method 700 may include providing, by the controller of the lighting device, a response to the command via the light source or a speaker of the lighting device.

In some example embodiments, the method 700 may include more or fewer steps without departing from the scope of this disclosure.

Figure 8:
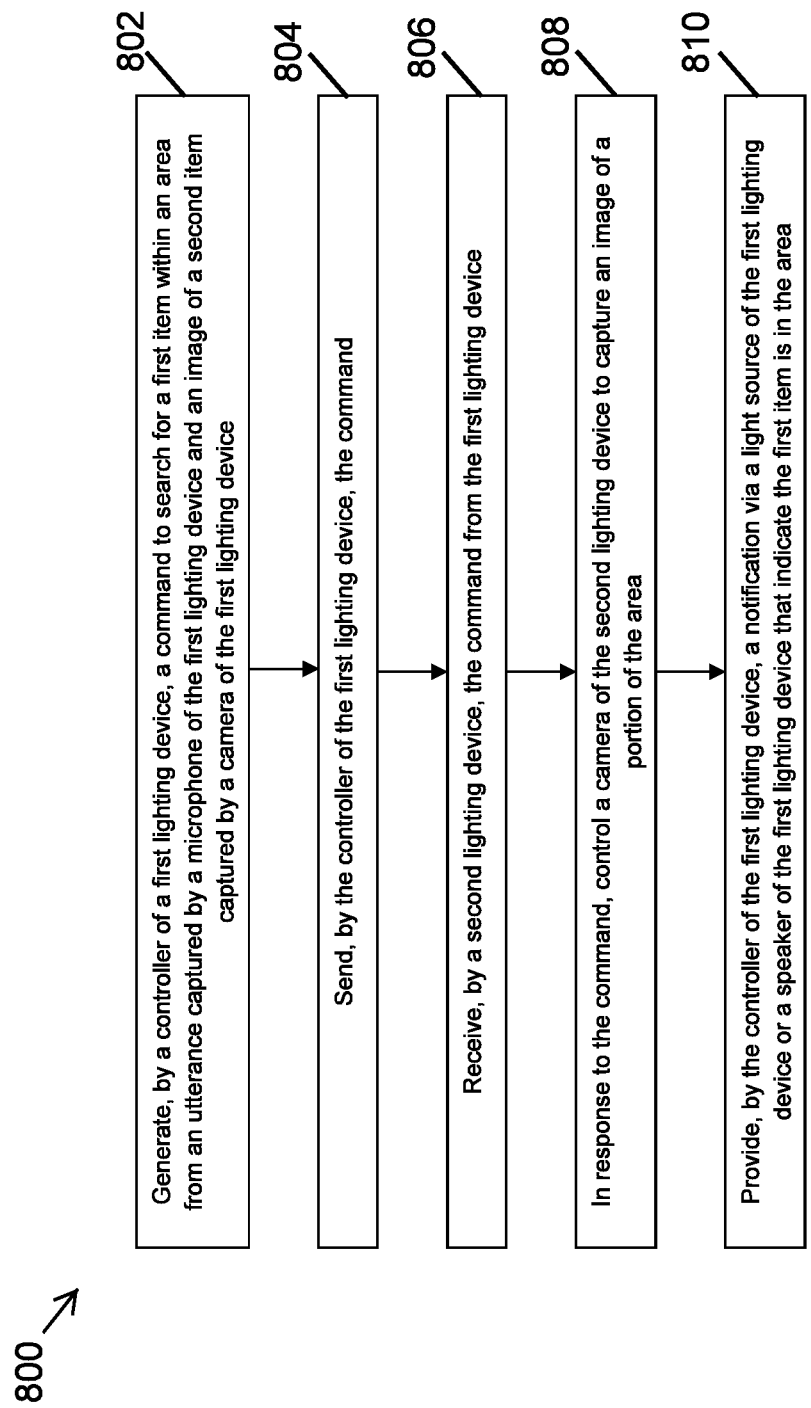
FIG. 8 illustrates a method of providing voice and vision-based service by a lighting device according to another example embodiment.

FIG. 8 illustrates a method 800 of providing voice and vision-based service by a lighting device according to another example embodiment. The method may include generating, by a controller (e.g., the controller 116) of the lighting device (e.g., the lighting device 102), a command to search for a first item within an area from an utterance captured by a microphone of the first lighting device and an image of a second item captured by a camera of the first lighting device; sending, by the controller of the first lighting device, the command; receiving, by a second lighting device, the command from the first lighting device; in response to the command, controlling a camera of the second lighting device to capture an image of a portion of the area; and providing, by the controller of the first lighting device, a notification via a light source of the first lighting device or a speaker of the first lighting device that indicate the first item is in the area.

In some example embodiments, the method 800 may include more or fewer steps without departing from the scope of this disclosure.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the scope of the following claims, the scope of which are to be accorded the broadest interpretation so as to encompass modifications and equivalent structures.

What is claimed is:

1. A lighting device, comprising:
a microphone;
a camera; and
a controller configured to:
control a light source of the lighting device;
determine whether an utterance captured by the microphone or a gesture captured by the camera corresponds to a wake-word;
generate a command based on at least an image of an item captured by the camera if the controller determines that the utterance or the gesture corresponds to the wake-word;
send the command to a cloud server; and
provide a response to the command, wherein the response is received from the cloud server.

2. The lighting device of claim 1, wherein the controller is configured to generate the command based on the image of the item captured by the camera and a second utterance captured by the microphone.

3. The lighting device of claim 2, wherein the controller is configured to send audio data generated from the second utterance captured by the microphone to the cloud server and to use a translation of the second utterance received from the cloud server to generate the command.

4. The lighting device of claim 1, wherein the controller is configured to generate the command based on the image of the item captured by the camera and a second gesture captured by the camera.

5. The lighting device of claim 4, wherein the controller is configured to send image data generated from the second gesture captured by the camera to the cloud server and to use a translation of the second gesture received from the cloud server to generate the command.

6. The lighting device of claim 1, wherein the controller is configured to generate the command based on the image of the item captured by the camera and a written text captured by the camera.

7. The lighting device of claim 6, wherein the controller is configured to send data generated from the written text captured by the camera to the cloud server and to use a translation of the written text received from the cloud server to generate the command.

8. The lighting device of claim 1, wherein the controller is configured to provide the response to the command via a light source of the lighting device or a speaker of the lighting device.

9. The lighting device of claim 1, wherein the controller is configured to send the image of the item to a cloud server to identify the item and to use an identification of the item from the cloud server to generate the command.

10. The lighting device of claim 1, wherein the controller is configured to identify the item and to use an identification of the item to generate the command.

11. The lighting device of claim 1, wherein the controller is configured to provide a visual indication, by the light source, in response to determining that the utterance or the gesture corresponds to the wake-word.

12. A non-transitory computer-readable medium of a controller of a lighting device, wherein the non-transitory computer-readable medium contains instructions executable by a processor, the instructions comprising:
controlling a light source of the lighting device;
determining whether an utterance captured by a microphone of the lighting device or a gesture captured by a camera of the lighting device corresponds to a wake-word;
generating a command based on at least an image of an item captured by the camera if the utterance or the gesture corresponds to the wake-word;
sending the command to a cloud server; and
providing a response to the command, wherein the response is received from the cloud server based on the command provided by the controller.

13. The non-transitory computer-readable medium of claim 12, wherein generating the command based on the at least the image of the item captured by the camera includes generating the command based on the image of the item captured by the camera and a second utterance captured by the microphone.

14. The non-transitory computer-readable medium of claim 13, wherein the instructions further comprise sending audio data generated from the second utterance captured by the microphone to the cloud server and generating the command using a translation of the second utterance received from the cloud server.

15. The non-transitory computer-readable medium of claim 12, wherein generating the command based on the at least the image of the item captured by the camera includes generating the command based on the image of the item captured by the camera and a second gesture captured by the camera.

16. The non-transitory computer-readable medium of claim 15, wherein the instructions further comprise sending image data generated from the second gesture captured by the camera to the cloud server and generating the command using a translation of the second gesture received from the server.

17. The non-transitory computer-readable medium of claim 12, wherein generating the command based on the at least the image of the item captured by the camera includes generating the command based on the image of the item captured by the camera and a written text captured by the camera.

18. A lighting system, comprising:
a first lighting device comprising a microphone, a first camera, and a first controller, wherein the first controller is configured to generate a command to search for a first item in an area based on an utterance captured by the microphone and an image of a second item captured by the first camera and wherein the first item and the second item are a same type of items; and
a second lighting device comprising a second camera and a second controller, wherein the second controller is configured to:
receive the command from the first lighting device;
control the second camera to capture an image of the area in response to the command; and
provide a response to the first lighting device, wherein, based on the response to the first lighting device, the first controller is configured to provide a notification via a light source of the first lighting device or a speaker of the first lighting device indicating whether the first item is in the area.

19. The lighting system of claim 18, wherein the second controller is configured to send the image of the area to a cloud server to determine whether the first item appears in the image.

20. The lighting system of claim 18, wherein the second controller is configured to provide a second notification via a light source of the second lighting device or a speaker of the second lighting device indicating whether the first item is in the area.

* * * * *